US012371769B2

(12) United States Patent
Diaz Fidalgo et al.

(10) Patent No.: US 12,371,769 B2
(45) Date of Patent: Jul. 29, 2025

(54) METHOD FOR SCHEDULING PRODUCTION ON A CONTINUOUS GALVANIZING LINE

(71) Applicant: ArcelorMittal, Luxembourg (LU)

(72) Inventors: Diego Diaz Fidalgo, Aviles Asturias (ES); Silvino Fernandez Alzueta, Aviles Asturias (ES); Segundo Alvarez Garcia, Aviles Asturias (ES); David Mendez Heres, Aviles Asturias (ES)

(73) Assignee: ArcelorMittal, Luxembourg (LU)

( * ) Notice: Subject to any disclaimer, the term of this patent is extended or adjusted under 35 U.S.C. 154(b) by 451 days.

(21) Appl. No.: 17/776,039

(22) PCT Filed: Nov. 6, 2020

(86) PCT No.: PCT/IB2020/060459
§ 371 (c)(1),
(2) Date: May 11, 2022

(87) PCT Pub. No.: WO2021/094883
PCT Pub. Date: May 20, 2021

(65) Prior Publication Data
US 2022/0396862 A1 Dec. 15, 2022

(30) Foreign Application Priority Data
Nov. 12, 2019 (WO) .................. PCT/IB2019/059691

(51) Int. Cl.
*G06Q 10/06* (2023.01)
*C23C 2/00* (2006.01)
*G06Q 10/0631* (2023.01)

(52) U.S. Cl.
CPC ............ *C23C 2/0035* (2022.08); *C23C 2/003* (2013.01); *C23C 2/0038* (2022.08); *C23C 2/51* (2022.08); *G06Q 10/06311* (2013.01)

(58) Field of Classification Search
CPC ...................................................... G06Q 10/06
(Continued)

(56) References Cited

U.S. PATENT DOCUMENTS

2013/0061986 A1 3/2013 Vanhee et al.
2014/0175713 A1 6/2014 Roessiger et al.
(Continued)

FOREIGN PATENT DOCUMENTS

CN 101344781 A 1/2009
JP H09183044 A 7/1997
(Continued)

OTHER PUBLICATIONS

Search Report of PCT/IB2020/060459 dated Dec. 18, 2020.
(Continued)

*Primary Examiner* — Nga B Nguyen
(74) *Attorney, Agent, or Firm* — Davidson Kappel LLC (57) ABSTRACT

A method for setting the production schedule of a multiplicity of galvanized coils of metallic strip on a continuous galvanizing line is provided, the method including the steps of evaluating, for each possible combination of two uncoated coils, the impact of the transition from the first uncoated coil to the second uncoated coil on the quality of the galvanized coils, allocating to each possible combination of uncoated coils a weighting factor which depends on the results of the previous step and which takes into account the line constraints, computing the results of the previous step by calculating, for a number of possible schedules of the multiplicity of uncoated coils, a score which depends on the sum of the weighting factors attributed to the combinations of uncoated coils involved in the given schedule and by selecting the schedule with the optimal score.

24 Claims, 2 Drawing Sheets

(58) Field of Classification Search
USPC .................................................... 705/7.13
See application file for complete search history.

(56) References Cited

U.S. PATENT DOCUMENTS

| | | | | |
|---|---|---|---|---|
| 2014/0195034 | A1* | 7/2014 | Tang | ............... G05B 19/418 |
| | | | | 700/147 |
| 2016/0155204 | A1* | 6/2016 | Tang | ............... G06Q 50/04 |
| | | | | 705/7.24 |

FOREIGN PATENT DOCUMENTS

| | | | |
|---|---|---|---|
| JP | 2013008268 | A | 1/2013 |
| JP | 2014028394 | A | 2/2014 |
| KR | 20100126311 | A | 12/2010 |
| WO | WO 2019012002 | A1 | 1/2019 |

OTHER PUBLICATIONS

Written Opinion of PCT/IB2020/060459.
Weiss Cohen Miri et al, "A decision support flexible scheduling system for continuous galvanization lines using genetic algorithm", Production Engineering, Carl Hanser Verlag, DE, vol. 13, No. 1, doi:10.1007/S11740-018-0856-6, ISSN 0944-6524, (Oct. 31, 2018), pp. 43-52, (Oct. 31, 2018).
Vaez Parinaz et al, "Sustainability in a lot-sizing and scheduling problem with delivery time window and sequence-dependent setup cost consideration", Sustainable Cities and Society, Elsevier, Amsterdam, NL, vol. 51, doi:10.1016/J.SCS.2019.101718, ISSN 2210-6707, (Jul. 21, 2019), (Jul. 21, 2019).
Fernańdez, Silvino & Alvarez, Segundo & Díaz, Diego & Iglesias, Miguel & Ena, Borja. (2014). Scheduling a Galvanizing Line by Ant Colony Optimization. 146-157. 10.1007/978-3-319-09952-1_13.
Wikipedia Article "Galvanisation", downloaded on Jun. 29, 2023 at https://fr.wikipedia.org/wiki/Galvanisation#Galvanisation_, see machine translation.

* cited by examiner

METHOD FOR SCHEDULING PRODUCTION ON A CONTINUOUS GALVANIZING LINE

The present invention relates to a method for scheduling the production of galvanized coils on a continuous galvanizing line, the scheduling method being preferably implemented by an electronic scheduling device.

The invention also relates to a computer program including software instructions which, when executed by a processor, implement such a scheduling method.

The invention also relates to an electronic scheduling device for scheduling the production of galvanized coils on a continuous galvanizing line.

The invention also relates to an installation for delivering galvanized coils, the installation comprising a continuous galvanizing line for producing the galvanized coils and such an electronic scheduling device.

BACKGROUND

Galvanizing lines are known to coat the surfaces of a steel strip with a layer of zinc or zinc alloy. Schematically, steel coils are uncoiled at the line entry, annealed in a furnace, immersed in a bath of molten zinc and re-coiled. To make the process continuous, the tail of each coil is bound to the head of the following coil. From the line perspective, the raw material is a composite strip whose features, such as the width, the thickness, the section, the grade, differ along the strip length.

Similarly, the finish product is a composite strip whose final characteristics, such as zinc thickness, roughness, temporary protection, differ along the strip length.

SUMMARY OF THE INVENTION

The process parameters of the galvanizing lines have thus to be regularly adapted, to take into account the changes in the features of the steel strip and to reach the technical specifications of this portion of the steel strip.

As it takes some time to reach the new targets of the process parameters, a certain length of the steel strip can be out of the technical specifications and has consequently to be scrapped or sold as second choice. A certain length of the steel strip can also present defects such as zinc overcoating, oil soiling, surface defects.

Moreover, the differences between two consecutive coils can lead to difficulties. For example, it can be difficult to weld two coils of very different grades, the wider head of a coil can crash against elements of the line, and it can be difficult to adapt the tension when the sections of the two coils are very different.

In worst case scenarios, the difference between two consecutive coils is so important that the strip can break, notably in the annealing furnace. In that case, the line must be stopped until the furnace cools down before removing the steel strip. Then the furnace is heated up again before the production is resumed.

By carefully selecting the order of the bare coils to be galvanized, it is possible to select transitions that limit the length of strip to be scrapped, the occurrence and severity of defects and the occurrence of strip breaks.

It is known to schedule manually the production based on the expertise of the operators but it nevertheless leads to the necessity to regularly use transition coils, i.e. small coils without customer order inserted between two coils to make them compatible. This decreases the line productivity and increases complexity of operations.

It is also known to use commercial software whose aim is to find a sequence of coils that smooths as much as possible the transitions according to several product variables (width, thickness, zinc coating weight . . . ). Each kind of transition according to a given product variable gets an arbitrary penalty or bonus. For example, the more the zinc coating weight differs between two coils, the more the penalty increases. All the penalties and bonuses are added and the overall score must be minimized. Unfortunately, smoothing the transitions according to one product variable is often incompatible with smoothing the transitions according to another product variable and the transition according to a given product variable may impact differently several steps of the process. Moreover, the penalty/bonus approach is not adapted to variations in the mix of products.

An aim of the present invention is therefore to remedy the drawbacks of the prior art by providing a method for scheduling the production of a multiplicity of galvanized coils which improves the quality of the strip processed during transitions between coils, improves line productivity and decreases the complexity of operations.

The present invention provides a method for setting the production schedule of a multiplicity of galvanized coils of metallic strip on a continuous galvanizing line comprising an annealing furnace, a zinc pot and a wiping machine, the method comprising the steps of:

Collecting a multiplicity of characteristics defining each uncoated coil to be galvanized, a multiplicity of specifications to be reached for each galvanized coil, a multiplicity of process parameters required to reach the specifications of each galvanized coil and a multiplicity of line constraints, Evaluating, for each possible combination of two uncoated coils, the impact of the transition from the first uncoated coil to the second uncoated coil on the quality of the galvanized coils in relation to at least the following two sets of parameters:
  the adjustment of the temperature $T_p$ and speed S of the metallic strip in the annealing furnace,
  the adjustment of the pressure P of the wiping medium and distance D of the wiping machine from the metallic strip at the exit of the zinc pot, Allocating to each possible combination of uncoated coils a weighting factor which depends on the results of the previous step and which takes into account the line constraints, Computing the results of the previous step by calculating, for a number of possible schedules of the multiplicity of uncoated coils, a score which depends on the sum of the weighting factors attributed to the combinations of uncoated coils involved in the given schedule and by selecting the schedule with the optimal score.

The method may also have the optional features listed below, considered individually or in combination:
  the multiplicity of characteristics defining each uncoated coil comprises the thickness, the steel grade, the mechanical properties, the width and the hardness,
  the multiplicity of specifications to be reached for each galvanized coil comprises the zinc coating weight, the zinc coating weight tolerance, the occurrence of temper-rolling and the elongation to be reached during temper-rolling,
  the multiplicity of process parameters required to reach the specifications of each galvanized coil comprises the target temperature in the annealing furnace, the temperature tolerance in the annealing furnace, the line speed, the line speed tolerance in the annealing furnace, the wiping pressure P, the wiping distance D and the tension and force of the temper-rolling, the multiplicity of line constraints comprises the maximum capabilities of the line and transitions unauthorized by line operators, during the collecting step, the data are collected either manually or are obtained from an existing database or are computed, the collecting step comprises a modeling sub-step during which at least part of the multiplicity of process parameters is calculated from empirical and/or physical and/or statistical laws or equations.

the impact of the transition from the first uncoated coil to the second uncoated coil on the product quality in relation to one set of parameters is attributed a weighting coefficient.

for each possible combination of two uncoated coils, the adjustment of the band temperature and speed in the annealing furnace is attributed a weighting coefficient which depends on the gap between the temperature tolerances of the two coils and/or on the gap between the speed tolerances of the two coils, the weighting factor allocated to each possible combination of uncoated coils is the sum of the weighting coefficients attributed to the sets of parameters, the continuous galvanizing line further comprises a temper-rolling and the impact of the transition from the first uncoated coil to the second uncoated coil on the product quality is further evaluated in relation to the adjustment of the tension $T_s$ and force F of the temper rolling, for each possible combination of two uncoated coils, the adjustment of the tension $T_s$ and force F of the temper rolling is attributed a weighting coefficient which depends on the line speed and the time needed to transition from one tension to another and/or from one pression to another, the continuous galvanizing line further comprises an entry accumulator and the impact of the transition from the first uncoated coil to the second uncoated coil on the product quality is further evaluated in relation to the adjustment of the tension in the entry accumulator and/or in the annealing furnace, the continuous galvanizing line further comprises a tension leveler and the impact of the transition from the first uncoated coil to the second uncoated coil on the product quality is further evaluated in relation to the adjustment of the tension in the tension leveler, the continuous galvanizing line comprises a galvannealing furnace and the impact of the transition from the first uncoated coil to the second uncoated coil on the product quality is further evaluated in relation to the adjustment of the heating power in the galvannealing furnace, the continuous galvanizing line further comprises an oiling machine configured to apply oil on the galvanized coil and the impact of the transition from the first uncoated coil to the second uncoated coil on the product quality is further evaluated in relation to the adjustment of the oil quantity and/or of the oil nature in the oiling machine, the continuous galvanizing line further comprises a chemical treatment section configured to apply a passivation coating on the galvanized coil and the impact of the transition from the first uncoated coil to the second uncoated coil on the product quality is further evaluated in relation to the passivation process adjustment, the score calculated for a given schedule of the multiplicity of uncoated coils is the sum of the weighting factors attributed to the combinations of uncoated coils composing the schedule, the score calculated for a given schedule of the multiplicity of uncoated coils includes sequence weighting terms in addition to the sum of the weighting factors attributed to the combinations of uncoated coils composing the schedule, the method further comprises the steps of:
Displaying the schedule with the optimal score and modifying it manually or automatically,
Computing the score of the modified schedule.

The present invention also provides a computer program including software instructions which, when executed by a processor, implements the method according to the invention.

The present invention also provides an electronic scheduling device for setting the production schedule of a multiplicity of galvanized coils of metallic strip on a continuous galvanizing line comprising an annealing furnace, a zinc pot and a wiping machine, the electronic monitoring device comprising:

An acquisition module configured for collecting a multiplicity of characteristics defining each uncoated coil to be galvanized, a multiplicity of specifications to be reached for each galvanized coil, a multiplicity of process parameters required to reach the specifications of each galvanized coil and a multiplicity of line constraints, An allocation module configured for evaluating, for each possible combination of two uncoated coils, the impact of the transition from the first uncoated coil to the second uncoated coil on the product quality in relation to at least the following two sets of parameters:
the adjustment of the temperature $T_p$ and speed S of the metallic strip in the annealing furnace,
the adjustment of the pressure P of the wiping medium and distance D of the wiping machine from the metallic strip at the exit of the zinc pot,
and for allocating to each possible combination of uncoated coils a weighting factor which depends on the results of the impact evaluation and which takes into account the line constraints, A computation module configured for computing the results obtained in the allocation module by calculating, for a number of possible schedules of the multiplicity of uncoated coils, a score which depends on the sum of the weighting factors attributed to the combinations of uncoated coils involved in the given schedule and by selecting the schedule with the optimal score.

The electronic scheduling device according to the invention may optionally comprise a validation module configured for offering a viewing of the schedule selected in the computation module and for allowing a validation or a manual or automatic adjustment of the selected module.

The present invention also provides also an installation for delivering a multiplicity of galvanized coils, the installation comprising:
A continuous galvanizing line for producing the multiplicity of galvanized coils,
An electronic scheduling device for setting the production schedule of the multiplicity of galvanized coils, wherein the electronic scheduling device is according to the invention.

BRIEF DESCRIPTION OF THE DRAWINGS

The invention will be better understood by reading the following description, which is provided purely for purposes of explanation and is in no way intended to be restrictive, with reference to.

DETAILED DESCRIPTION

The continuous galvanizing line according to the invention comprises at least an annealing furnace, a zinc pot and a wiping machine. By "zinc pot", it is meant a bath of molten metallic elements such as zinc, aluminum, silicon, magnesium. Depending on the bath composition, it is possible to produce, for example, galvanized steel, steels coated with a zinc alloy comprising 5 wt. % of aluminum (Galfan®), steels coated with a zinc alloy comprising 55 wt. % of aluminum, about 1.5 wt. % of silicon, the remainder consisting of zinc and inevitable impurities due to the processing (Aluzinc®, Galvalume®), steels coated with an aluminum alloy comprising from 8 to 11 wt. % of silicon and from 2 to 4 wt. % of iron, the remainder consisting of aluminum and inevitable impurities due to the processing (Alusi®), steels coated with a layer of aluminum (Alupur®), steels coated with a zinc alloy comprising 0.5 to 20% of aluminum, 0.5 to 10% of magnesium, the remainder consisting of zinc and inevitable impurities due to the processing. In the rest of the description, it will only be referred to zinc knowing that other elements can be part of the metallic coating applied on the steel strip and that zinc can even be absent.

The continuous galvanizing line can additionally comprise at least one of the following devices: a welding machine, an entry accumulator, a cooling tower, a temper-rolling, an oiling machine, a side-trimmer, a chemical treatment section, a galvannealing furnace.

The first step 100 of the method (see FIG. 2) comprises collecting a multiplicity of characteristics defining each uncoated coil to be used to produce each galvanized coil, a multiplicity of specifications to be reached for each galvanized coil, a multiplicity of process parameters required to reach the specifications of each galvanized coil and a multiplicity of line constraints, collectively referred to as representative data.

As for the uncoated coils, the collected characteristics are the intrinsic characteristics of the steel strip to be processed on the galvanizing line. Examples of intrinsic characteristics include, among others, the steel grade, the chemistry of the steel substrate, the mechanical properties of the steel substrate, the strip width, the strip section, the strip thickness, the strip length, the coil weight, the steel hardness.

According to one preferred embodiment, the multiplicity of characteristics defining each uncoated coil comprises the thickness, the steel grade, the mechanical properties, the width and the hardness.

As for the galvanized coils, the specifications are, among others, the mechanical properties of the galvanized coil, the weight of the zinc coating to be applied, the zinc coating weight tolerance, the surface aspect of the zinc coating, the occurrence of temper-rolling, the elongation to be reached during temper-rolling, the elongation tolerance in temper-rolling, the roughness after temper-rolling, the roughness tolerance in temper-rolling, the occurrence of chemical treatment after temper-rolling, the flatness target on the galvanized strip, the flatness tolerance in the tension-leveler machine, the oil type, the passivation type, the occurrence of thermal treatment after temper-rolling, the iron content in the thermally-treated zinc coating, the level of quality required by the customer.

According to one preferred embodiment, the multiplicity of specifications to be reached for each galvanized coil comprises the zinc coating weight, the zinc coating weight tolerance, the occurrence of temper-rolling and the elongation to be reached during temper-rolling.

Examples of process parameters required to reach the specifications are, among others, the thermal cycle in the annealing furnace, the target temperature and temperature tolerance in the annealing furnace, the target speed and the speed tolerance in the annealing furnace, the wiping pressure, the wiping distance, the line speed, the temper-rolling force, the temper-rolling tension, the heating power target and the heating tolerance in the galvannealing furnace.

According to one preferred embodiment, the multiplicity of process parameters required to reach the specifications of each galvanized coil comprises the target temperature in the annealing furnace, the temperature tolerance in the annealing furnace, the line speed, the line speed tolerance in the annealing furnace, the wiping pressure P, the wiping distance D and the tension and force of the temper-rolling.

As for the line constraints, it can include, among others, the maximum capabilities of the line such as the welding capabilities of the welder machine, the length of the entry strip accumulator, the maximum line speed, the maximum line acceleration, the length of the annealing furnace, the maximum furnace tube temperature, the maximum change speed of the wiping pressure of the wiping machine, the maximum change speed of the wiping distance of the wiping machine, the maximum adjustment speed of the temper-rolling force and the maximum change allowed in strip width, thickness and/or cross section as specified by the line manufacturer, the obligation of grouping together all the coils of an order, the obligation of grouping together certain coils to avoid undesired setups in the annealing furnace and unauthorized transitions. The unauthorized transitions are transitions that are too challenging for some reason and that the line operators have decided to ban. Examples of unauthorized transitions are, among others, transitions for which coating weight ranges do not overlap, transitions for which speed ranges do not overlap, transitions for which annealing tolerances do not overlap, transitions for which the second coil is more than 250 mm wider than the first one while they are both less than 1 mm thick, transitions between two steel grades not weldable to each other, transitions for which the jump in force applied in the temper-rolling exceeds 200 T, widening out for products to be used as visible automotive parts, i.e. transitioning to a wider coil, transitions that cannot be done without a transition coil.

During the first step of the method, the representative data, i.e. the multiplicity of characteristics/specifications/process parameters/line constraints, can be collected manually or obtained from an existing database or even computed. In particular, the process parameters required to reach a given specification can be obtained from an existing database so that they do not have to be acquired from scratch each time a new multiplicity of uncoated coils has to be scheduled. They can be preset under the form of values or ranges or under the form of empirical and/or physical and/or statistical laws or equations linking the process parameter(s) to the specification(s) and/or the uncoated product characteristics. Preferably, during the first step, the multiplicity of process parameters that are related to the specifications of the multiplicity of uncoated coils to be scheduled is selected among all the preset process parameters. Similarly, the line constraints are preferably obtained from an existing database. Preferably, they are obtained by selecting a running mode, which is a preset combination of line constraints related to the kind of galvanized coils to be produced during the schedule, e.g. galvannealed (GA) products, galvanized (GI) products, galvalume (GU) products, exposed aspect (EXP) for Automotive, Dual-Phase (DP) products, hot-rolled (HR) initial products . . . .

Figure 2:
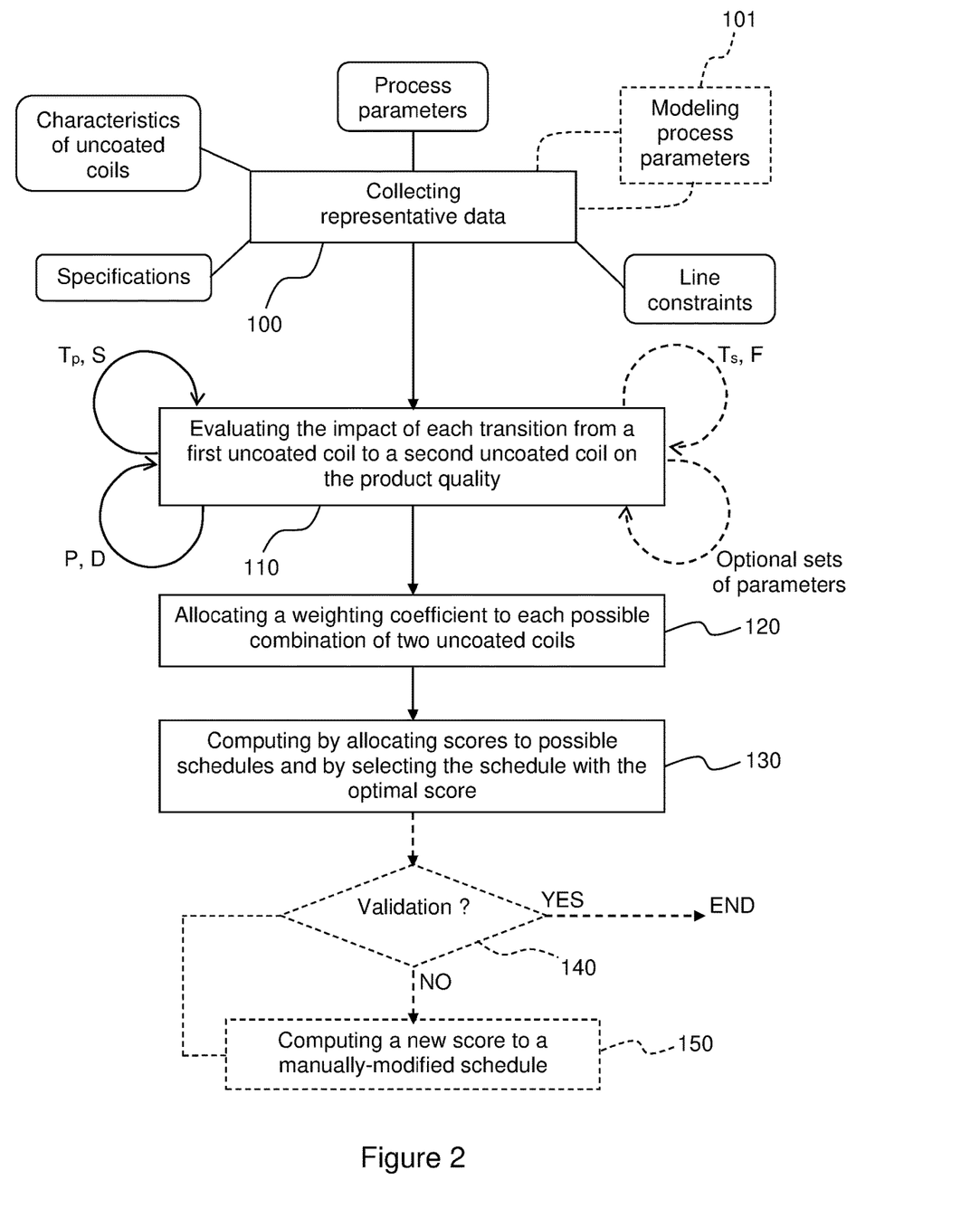

According to one embodiment, the first step comprises a modeling sub-step 101 during which at least part of the multiplicity of process parameters is calculated by using empirical and/or physical and/or statistical laws or equations linking the process parameter(s) to the specification(s) and/or the uncoated product characteristics. Preferably, the target speed of each coil is calculated accordingly.

During the second step 110 of the method, for each possible combination of two uncoated coils, the impact of the transition from the first uncoated coil to the second uncoated coil on the product quality in relation to selected sets of process parameters is evaluated. During the evaluation of a given combination of two uncoated coils, a weighting coefficient is attributed in relation to each selected set of parameters. By "each possible combination of two uncoated coils", it has to be noted that, for two coils A and B, combination AB is distinct from combination BA.

The present inventors have conducted extensive research to assess which process parameters, among the tens of ones available, had an impact on the product quality when transitioning from one coil to the following one.

When transitioning from one coil to another, the thermal cycle of the annealing furnace might have to be adapted. During this adjustment, the portion of the strip in the furnace and the portion introduced in the furnace may reach a Peak Metal Temperature out of the target range. In that case, these portions might have to be scrapped. Depending on the thickness of the coils involved in the transition, there are several possibilities in a transition between two coils:

- Both coils have a thickness higher than the critical thickness of the annealing furnace, which is defined as the strip thickness that makes the line works at maximum strip speed and makes the furnace works with the highest tubes temperature for a given annealing cycle. In that case, the line works at maximum tubes temperature and the line speed must be adjusted for managing the transition,
- Both coils have a thickness lower than the critical one. In that case, the line works at maximum speed and the tubes temperature must be adapted for managing the transition,
- One coil has a thickness higher than the critical thickness and the second one lower. In that case, both the line speed and the tubes temperature must be adapted for managing the transition.

During the step of evaluating the impact of the transition, the difference in thickness and/or steel grade and/or mechanical properties and/or width of each possible combination of two uncoated coils triggers the evaluation of how the adjustment of the band temperature $T_p$ and/or speed S of the metallic strip in the annealing furnace impacts the product quality. The adjustment of the temperature and/or speed can be attributed a weighting coefficient which can depend on the gap between the temperature tolerances of the two coils and/or the gap between the speed tolerances of the two coils.

According to one embodiment, the evaluation of how the adjustment of the temperature and/or speed in the annealing furnace impacts the product quality is obtained by numerical simulation from a numerical model of the annealing furnace.

When transitioning from one coil to another, the wiping conditions at the exit of the zinc pot might have to be adapted. During this adjustment, the portion of the strip going through the wiping machine is undercoated or overcoated. In that case, the portion may have to be scrapped or the coil reworked. Depending on the line constraints in term of quality management, there are several possibilities in a transition between two coils:

- Transition type 1: the pressure P of the wiping medium and distance D between the wiping machine and the strip are controlled so that the minimum coating weight target is met for both coils. When transitioning to a higher coating weight range, it implies overcoating the tail of the first coil. When transitioning to a lower coating weight range, it implies overcoating the head of the next one. At best, this transition type leads to zinc overconsumption. In addition, when the coating weight ranges of the two coils do not overlap, a portion of either the first coil or the second coil is out of specifications and has thus to be scrapped or the coil reworked.
- Transition type 2: the pressure P and distance D of the wiping machine are systematically adapted on the head of the second coil. This transition type leads to zinc overconsumption and possibly the head of the second coil is out of specifications when transitioning to a lower coating range. The head of the second coil may have to be scrapped. This transition type also leads to zinc undercoating when transitioning to a higher coating range. The head of the second coil has thus to be scrapped or the coil reworked.
- Similarly, if the two coils have to be processed at different line speeds because of a difference notably in thickness and/or steel grade and/or mechanical properties and/or width, a portion of the strip going through the wiping machine during the wiping conditions adjustment resulting from the speed adjustment might be out of specifications.

During the step of evaluating the impact of the transition, the difference in coating weight and/or line speed of each combination of two uncoated coils triggers the evaluation of how the adjustment of the pressure P of the wiping medium and distance D of the wiping machine from the strip at the exit of the zinc pot impacts the product quality and the adjustment of the pressure P and distance D can be attributed a weighting coefficient.

Depending on the line constraints, the weighting coefficient can notably depend on either:

- The difference between the minimum coating weight tolerance of the second coil and the coating weight target of the first coil, or
- The difference between the coating weight target of the first coil and the maximum coating weight tolerance of the second coil, or
- The ratio ((minimum coating weight tolerance of second coil-coating weight target of first coil)/(coating weight target of second coil-coating weight target of first coil)) or The ratio ((coating weight target of first coil-maximum coating weight tolerance of second coil)/(coating weight target of second coil-coating weight target of first coil)).

When transitioning from one coil to another, the temper-rolling may be opened or closed or the tension and force of the temper-rolling might have to be adapted. During this adjustment, a portion of the strip going through temper-rolling might be out of elongation specifications and/or might wrinkle and/or might presents wavy edges or might even break. In that case, the portion must be scrapped or the coil reworked.

In one variant of the invention, during the step of evaluating the impact of the transition, the difference in steel grade and/or in mechanical properties and/or in hardness and/or in elongation targets of each combination of two uncoated coils or the absence of temper-rolling for one of the two coils triggers the evaluation of how the adjustment of the tension $T_s$ and force F of the temper rolling impacts the product quality and the adjustment of the tension and force can be attributed a weighting coefficient.

Depending on the line constraints, the weighting coefficient can notably be dependent on:
- the line speed and the time needed to transition from one tension to another and/or from one pression to another. The person skilled in the art, who knows the working ranges for each product variable and the capabilities of the temper-rolling, can easily estimate this transition time.
- or the probability that the coil portion is out of specification. The person skilled in the art, who knows the average time needed to transition from one tension to another and/or one pression to another, can easily estimate this probability.

When binding two coils with different widths at the entry section of the galvanizing line, a notch is optionally made after welding to warn the side trimmer of the change of width. In case the difference in width is large, a double notch is made, which takes a longer time to be realized. If the additional time needed to do so exceeds the remaining time of strip accumulation at the entry looper, the line must be stopped and the portion of the strip located between the annealing furnace and the temper-rolling must be scrapped.

In one variant of the invention, during the step of evaluating the impact of the transition, the difference in width of each combination of two uncoated coils triggers the evaluation of how the notching time impacts the product quality. The notching time is attributed a weighting coefficient which can depend on the probability that the time needed to weld and notch the two coils exceeds the time of strip accumulation at the entry looper. The person skilled in the art, who knows the average time needed to weld and notch on the considered galvanizing line, can easily calculate this probability.

Once the tail of a first coil has been welded to the head of a second coil, these two portions of coils are driven jointly through the different equipment of the line. As a given strip tension is set up in each equipment, the latter may not accommodate both the tension requirement of the first coil and the tension requirement of the second coil, which both depend on the section of the coil. If the difference in section of the two coils is important, the adequate tension for one of the coils can be much too high for the other one and it can provoke a strip breakage.

In one variant of the invention, during the step of evaluating the impact of the transition, the difference in section of each combination of two uncoated coils triggers the evaluation of how the adjustment of the strip tension in the entry accumulator impacts the product quality and the adjustment of the strip tension in the entry accumulator is attributed a weighting coefficient. The latter can, for example, depend on the probability of breakage in the entry accumulator. The person skilled in the art, who knows the maximum solicitations that can be applied on both coils and on the weld, can easily calculate this probability.

Similarly, the adjustment of the strip tension in the annealing furnace can be attributed a weighting coefficient which can, for example, depend on the probability of breakage in the annealing furnace.

At the exit of the temper-rolling, the strip can optionally go through a tension leveler to improve its flatness. When transitioning from one coil to another, the tension leveler may be opened or closed or the tension of the tension leveler might have to be adapted. During this adjustment, a portion of the strip going through the tension leveler might be out of elongation specifications and/or might presents loose edges. In that case, the portion must be scrapped or the coil reworked.

In one variant of the invention, during the step of evaluating the impact of the transition, the difference in thickness and/or in steel grade of each combination of two uncoated coils or the absence of tension leveling for the first coil triggers the evaluation of how the adjustment of the tension in the tension leveler impacts the product quality and the tension adjustment is attributed a weighting coefficient.

Depending on the line constraints, the weighting coefficient can be dependent on:
- the line speed and the time needed to transition from one tension to another. The person skilled in the art, who knows the working ranges for each product variable and the capabilities of the tension leveler, can easily calculate this transition time.
- or the probability that the coil portion is out of specification. The person skilled in the art, who knows the average time needed to transition from one tension to another, can easily calculate this probability.

The metallic coating applied on the strip can optionally be annealed to obtain a galvannealed coating. When transitioning from one coil to another, the heating power of galvannealing furnace might have to be adapted because of a change in chemistry or a change of line speed, resulting notably from a difference in thickness and/or steel grade and/or mechanical properties and/or width. During this adjustment, a portion of the strip going through the galvannealing surface might present a bright surface or powdering.

In one variant of the invention, during the step of evaluating the impact of the transition, the difference in line speed and/or in chemistry of the steel substrate of each combination of two uncoated coils or the need of galvannealing for one of the two coils triggers the evaluation of how the adjustment of the heating power in the galvannealing furnace impacts the product quality and the heating power adjustment is attributed a weighting coefficient. The latter can be for example dependent on the ability of the line to detect the defect either at the exit of the furnace or only at the end of the line.

At the exit of the line, in the oiling machine, the strip can be optionally oiled to improve its resistance to corrosion and its drawability. When transitioning from one coil to another, the oiling machine may be turned on or off or the oil type and/or the oil quantity might have to be changed. During this adjustment, a portion of the strip might notably receive too much oil which might lead to the coil collapsing in the yard.

In that case, the coil must be reworked. A portion of the strip might also be kept dry instead of oiled. In that case, the portion must be scrapped.

In one variant of the invention, during the step of evaluating the impact of the transition, the difference in oil nature or in oil coating weight of each combination of two uncoated coils or the need of oiling for one of the two coils triggers the evaluation of how the adjustment of the oil quantity and/or of the oil nature impacts the product quality and the oil adjustment is attributed a weighting coefficient. The latter can be for example dependent on the probability of occurrence of this defect.

At the exit of the line, in the chemical treatment section, the strip can be optionally passivated to improve its resistance to corrosion and its drawability. When transitioning from one coil to another, the chemical treatment section may notably be turned on or off. During this operation, a portion of the strip might not receive the correct passivation coating weight or might be passivated instead of been kept dry. In that case, the portion must be scrapped.

In one variant of the invention, during the step of evaluating the impact of the transition, the need of passivation for one of the two coils triggers the evaluation of how the passivation process adjustment impacts the product quality and the adjustment is attributed a weighting coefficient. The latter can be for example dependent on the probability of occurrence of this defect.

The principles described above can be adapted to each galvanizing line depending notably on its layout, on the products it processes or on its specific constraints so that the relevant sets of process parameters, and the corresponding characteristics they depend on, are selected ahead of the first step of the scheduling method.

That said, it has been observed that all the galvanizing lines have in common that the evaluation of the impact of the transition from the first uncoated coil to the second uncoated coil on the product quality is done in relation to a collection of sets of process parameters comprising at least the following sets:
- the adjustment of the temperature $T_p$ and speed S of the metallic strip in the annealing furnace,
- the adjustment of the pressure P of the wiping medium and distance D of the wiping machine from the metallic strip at the exit of the zinc pot.

Once the impact of the transition between two uncoated coils has been evaluated in relation to the defined sets of parameters and a weighting coefficient has been attributed in relation to each set of parameters, the combination of these two coils is attributed a weighting factor which depends on the weighting coefficients attributed in relation to each set of parameters. When doing so, the line constraints relevant to the considered transition are taken into account, i.e. the weighting factor is adjusted if the transition between two coils violate at least one of the line constraints.

Preferably, a transition which respects all the line constraints is attributed a weighting factor which is the sum of the individual weighting coefficients. According to another variant, a transition which respects all the line constraints is attributed a weighting factor in the form of a matrix of the individual weighting coefficients.

A transition which violates at least one of the line constraints, in particular an unauthorized transition, is attributed a penalty which preferably depends on the severity of the violation(s). Preferably, such transition is attributed a penalty in the form of a value to be added to the sum of the individual weighting coefficients or in the form of a secondary weighting factor. The penalty can be the sum of individual penalties which depend on the severity of each violation. According to another variant, such transition is attributed a penalty in the form of a matrix of individual penalties.

The term "weighting factor" must be understood as covering the possible combination of a weighting factor and a secondary weighting factor and the possible combination of a matrix of individual weighting coefficients and a matrix of individual penalties.

Once each possible combination of uncoated coils has been allocated a weighting factor, the results are computed so as to obtain an optimized schedule of the multiplicity of uncoated coils considered. Schematically, this computing is done by calculating, for the greatest possible number of possible schedules of uncoated coils in a certain time, a score which depends on the sum of the weighting factors attributed to the combinations involved in the schedule and by selecting the optimal score, which can be either the smallest score or the highest score depending how the weighting coefficients relate to the product quality. Preferably, the optimal score is the smallest score. As there might be a huge number of possible schedules and as the time to come to a conclusion is limited, the solution might be approximated. In other words, the algorithm might select the schedule with the lowest score among the schedules it has considered. The computing is preferably done based on algorithms developed or adapted to solve the famous Traveling Salesman Problem. In the present case, the cities to be visited by the salesman are the coils to be scheduled and the distance between each pair of cities is the weighting factor attributed to each pair of coils. A large number of algorithms have been developed to solve that problem and can be used in the scope of the present invention, such as Held-Karp algorithm and branch-and-bound algorithms. Heuristic and meta-heuristic algorithms, whose objective is to produce an approximate solution in a reasonable time frame that is good enough for solving the problem at hand, can also be used. Examples of such algorithms are the Nearest Neighbour algorithm, the Match Twice and Stitch (MTS), the Christofides algorithm, the Pairwise Exchange, the Lin-Kernighan heuristics, the Variable-opt method, the optimized Markov chain, the Tabu Search algorithm, and the Ant Colony Optimization.

During this computing, the algorithm will preferably not select as next candidate in a sequence under construction an uncoated coil whose weighting factor with the last coil of the sequence under construction includes a penalty. If it is not feasible, the algorithm will preferably select the uncoated coil whose weighting factor with the last coil of the sequence under construction has the lowest penalty. Similarly, the algorithm will preferably not select schedules involving an unauthorized transition, unless the multiplicity of uncoated coils cannot be scheduled without such a transition and thus without a transition coil.

According to one embodiment, the score is the sum of the weighting factors attributed to the combinations composing the schedule.

According to another embodiment, the score includes, in addition to the sum of weighting factors, sequence weighting terms related to the whole or partial sequence and which can only be calculated once the schedule is known or during its construction.

According to one embodiment, the score includes a sequence weighting term related to possible build-up on the roll immersed in the zinc pot. When transitioning to a wider coil, i.e. when widening out, the possible build-up on the pot roll may lead to linear defects. In that case, a certain length of the steel strip has to be scrapped or sold as second choice. The probability of generating this defect depends on the number of narrower coils immersed in the zinc pot before widening out. Accordingly, for schedules including widening out, each transition to a wider coil is attributed a weighting term which can depend on the number of narrower coils immersed in the zinc pot before widening out and the corresponding sequence weighting term is the sum of the weighting terms attributed to the transitions to a wider coil.

According to one embodiment, the score includes a sequence weighting term related to possible scratches on the temper-rolling rolls. When transitioning to a wider coil, the possible scratches formed on the rolls by the edges of the previous coils may lead to linear defects. In that case, a certain length of the steel strip has to be scrapped or sold as second choice. The probability of generating this defect depends on the number of narrower coils temper-rolled before widening out. Accordingly, for schedules including widening out, each transition to a wider coil is attributed a weighting term which can depend on the number of narrower coils temper-rolled before widening out and the corresponding sequence weighting term is the sum of the weighting terms attributed to the transitions to a wider coil.

According to one embodiment, the score includes a sequence weighting term related to possible scratches on the passivation rolls in the chemical treatment section. When transitioning to a wider coil, the possible scratches formed on the rolls by the edges of the previous coils may lead to linear defects. In that case, a certain length of the steel strip has to be scrapped or sold as second choice. The probability of generating this defect depends on the number of narrower coils passivated before widening out. Accordingly, for schedules including widening out, each transition to a wider coil is attributed a weighting term which can depend on the number of narrower coils passivated before widening out and the corresponding sequence weighting term is the sum of the weighting terms attributed to the transitions to a wider coil.

Once the algorithm ends, the schedule presenting the lowest score, among the schedules considered by the algorithm, is shown to the line operators for validation or for adjustment. This adjustment is optional and is done by the line operators based on their expertise. Adjusting the schedule can comprise switching two coils or inserting, between two coils that are not compatible, a transition coil or a coil available in the inventory and awaiting scheduling. It can be done manually or it can be automatically done at the request of the operators. In the case where coils are switched, the score of the modified schedule can be recalculated so that the positive impact of the switch on the product quality can be assessed.

Figure 1:
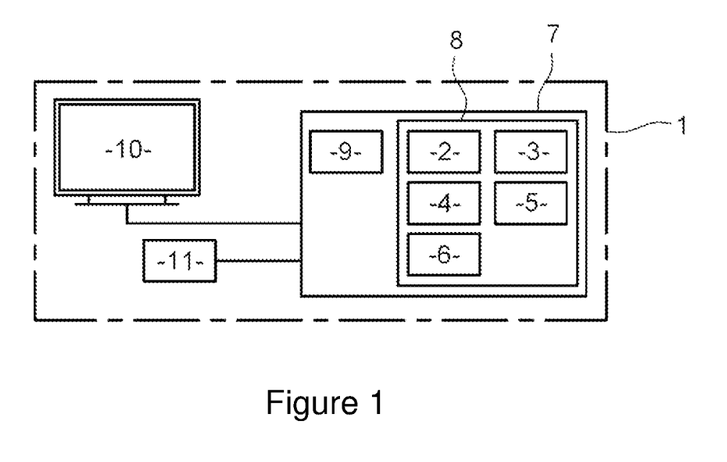
FIG. 1, which is a schematic illustration of an electronic scheduling device, FIG. 2, which is a flowchart of a method, according to the invention, for scheduling the production of a multiplicity of galvanized coils on a continuous galvanizing line, the scheduling method being implemented by the electronic scheduling device of FIG. 1.

As illustrated on FIG. 1, the scheduling method is preferably implemented by an electronic scheduling device 1.

The electronic scheduling device 1 comprises an acquisition module 2 configured for collecting a multiplicity of characteristics defining each uncoated coil to be galvanized, a multiplicity of specifications to be reached for each galvanized coil, a multiplicity of process parameters required to reach the specifications of each galvanized coil and a multiplicity of line constraints, collectively referred to as representative data.

According to one embodiment, the acquisition module 2 comprises a modeling sub-module 3 configured for calculating at least part of the multiplicity of process parameters from empirical and/or physical and/or statistical laws or equations linking the process parameter(s) to the specification(s) and/or the uncoated product characteristics.

The term "modeling" refers to the use of empirical and/or physical and/or statistical laws or equations to determine a parameter. It can also refer to a numerical simulation, such as a simulation run on a computer.

The electronic scheduling device 1 further comprises an allocation module 4 configured for evaluating, for each possible combination of two uncoated coils, the impact of the transition from the first uncoated coil to the second uncoated coil on the product quality in relation to the selected sets of parameters and for allocating, to each possible combination of uncoated coils, a weighting factor, which is dependent on the results of the impact evaluation and which takes into account the line constraints.

The electronic scheduling device 1 further comprises a computation module 5 configured for computing the results obtained in the allocation module and for selecting the schedule with the lowest score among the schedules it has considered.

In a preferred embodiment, the electronic scheduling device 1 comprises a validation module 6 configured for offering a viewing of the schedule selected in the computation module and for allowing a validation or adjustment of the proposed schedule. In the case where coils are switched, the score of the modified schedule can be recalculated in the computation module 5 so that the positive impact of the switch on the product quality can be assessed.

In the example of FIG. 1, the electronic scheduling device 1 includes a processing unit 7 formed for example of a memory 8 and of a processor 9 coupled to the memory. The electronic monitoring device may also include a display screen 10 and input/output means 11, such as a keyboard and a mouse, each being connected to the processing unit.

In this embodiment, the acquisition module 2, the allocation module 4 and the computation module 5, and in a preferred embodiment the validation module 6, are for example each realized, i.e. implemented, as a software executable by the processor or group of processors (referred in the following as processor) 9. The memory 8 of the processing unit 7 is adapted to store an acquisition software configured for collecting a multiplicity of characteristics defining each uncoated coil to be galvanized, a multiplicity of specifications to be reached for each galvanized coil, a multiplicity of process parameters required to reach the specifications of each galvanized coil and a multiplicity of line constraints; an allocation software configured for evaluating, for each possible combination of two uncoated coils, the impact of the transition from the first uncoated coil to the second uncoated coil on the product quality in relation to at least the following two sets of parameters:
- the adjustment of the band temperature $T_p$ and speed S of the strip in the annealing furnace,
- the adjustment of the pressure P of the wiping medium and distance D of the wiping machine with the strip at the exit of the zinc pot, and for allocating to each possible combination of uncoated coils a weighting factor which is dependent on the results of the impact evaluation and which takes into account the line constraints; and a computation software configured for computing the results obtained in the allocation module by calculating, for possible schedules of the multiplicity of uncoated coils, a score which depends on the sum of the weighting factors attributed to the combinations of uncoated coils involved in the given schedule and by selecting the schedule with the optimal score. In a preferred embodiment, the memory 8 of the processing unit 7 is adapted to store a validation software configured for offering a viewing of the schedule selected in the computation module and for either validating the selected schedule or allowing its manual adjustment.

The processor 9 of the processing unit 7 is then configured to execute the acquisition software, the allocation software and the computation software, and in a preferred embodiment the validation software.

When the electronic scheduling device 1 is in the form of one or more software programs, i.e. in the form of a computer program, it is also capable of being recorded on a computer-readable medium. The computer-readable medium is, for example, a medium capable of storing electronic instructions and being coupled to a bus of a computer system. For example, the readable medium is an optical disk, a magneto-optical disk, a ROM memory, a RAM memory, any type of non-volatile memory (for example EPROM, EEPROM, FLASH, NVRAM), a magnetic card or an optical card. A computer program with software instructions is then stored on the readable medium.

The operation of the electronic scheduling device 1 according to the invention will now be explained in view of FIG. 2 representing a flowchart of a method, according to the invention, for scheduling the production of a multiplicity of galvanized coils on a continuous galvanizing line.

Initially, in step 100, the electronic scheduling device 1 acquires, via its acquisition module 2, a multiplicity of characteristics defining each uncoated coil to be galvanized, a multiplicity of specifications to be reached for each galvanized coil, a multiplicity of process parameters required to reach the specifications of each galvanized coil and a multiplicity of line constraints.

In a preferred embodiment, the process parameters required to reach a given specification are stored in an existing database accessible by the acquisition module or preset in the acquisition module so that they do not have to be acquired from scratch each time a new multiplicity of uncoated coils has to be scheduled. They can be stored or preset under the form of values or ranges or under the form of empirical and/or physical and/or statistical laws or equations linking the process parameter(s) to the specification(s) and/or the uncoated product characteristics. Preferably, the acquisition module selects, among all the preset process parameters, the ones that are related to the specifications of the multiplicity of uncoated coils to be scheduled. Similarly, the line constraints are preferably stored in an existing database accessible by the acquisition module or preset in the acquisition module. More preferably, they are stored in the form of a preset combination of line constraints related to the kind of galvanized coil to be produced during the schedule, referred to as running modes.

Optionally, during a modeling sub-step 101, the acquisition module 2, through its modeling sub-module 3, calculates or models at least part of the multiplicity of process parameters from empirical and/or physical laws or equations linking the process parameter(s) to the specification(s) and/or the uncoated product characteristics.

In the next step 110, the electronic scheduling device 1 evaluates, via its allocation module 4, for each possible combination of two uncoated coils, the impact of the transition from the first uncoated coil to the second uncoated coil on the product quality in relation to at least the following two sets of parameters:

the adjustment of the band temperature $T_p$ and speed S of the metallic strip in the annealing furnace, the adjustment of the pressure P of the wiping medium and distance D of the wiping machine from the metallic strip at the exit of the zinc pot.

As previously described, for each possible combination of two uncoated coils, each set of parameters is attributed a weighting coefficient which depends on the collected characteristics.

Optionally, during step 110, the allocation module 4 can evaluate the impact of the transition from the first uncoated coil to the second uncoated coil on the product quality in relation to other sets of parameters.

In the next step 120, the electronic scheduling device 1 allocates, via its allocation module 4, to each possible combination of uncoated coils, a weighting factor, which is dependent on the results of the previous step 110 and which takes into account the line constraints.

As previously described, each possible combination of uncoated coils is attributed a weighting factor which depends on the weighting coefficients attributed in relation to each set of parameters.

During the next step 130, the electronic scheduling device 1 computes, via its computation module 5, the results obtained in the allocation module 4 by calculating, for a number of possible schedule of uncoated coils, and in particular for the greatest possible number of possible schedules of uncoated coils in a certain time, a score which depends on the sum of the weighting factors attributed to the combinations involved in the schedule and by selecting the schedule with the lowest score among the schedules that have been considered. The number of possible schedules can be a given number, possibly inputted in the scheduling device, or it can simply result from the time given to the computation module to display the selected schedule. The calculation is usually done for hundreds of possible schedules.

As previously described, computing is preferably done based on the algorithms developed to solve the Traveling Salesman Problem or adapted from it.

Optionally, in the next step 140, the electronic scheduling device 1 displays, via its validation module 6, the schedule selected in the computation module for validation or adjustment of the proposed schedule. If the schedule is validated by the line operators, then the scheduling method is terminated.

Otherwise, the schedule is modified either manually or automatically and the scheduling method goes to next step 150 wherein the electronic scheduling device 1 computes, via its computation module 5, the score of the modified schedule so that the positive impact of the modification on the product quality can be assessed. Once the score has been recalculated, the scheduling method is back to step 140 wherein the electronic scheduling device 1 displays, via its validation module 6, the schedule initially selected in the computation module and the modified schedule. The line operators can either validate one of the two schedules or make additional manual adjustments to the modified schedule.

The invention has been described above for the scheduling of individual coils. Nevertheless, the method also covers setting the production schedule of a multiplicity of orders, each order including a multiplicity of coils. According to one variant, all the coils of each order are identical. In that case, each order is identified as a generic coil. The "multiplicity of galvanized coils of metallic strip" as defined above is thus constituted by all the generic coils. Combinations of generic coils are taken into account when evaluating the impact of the transition from one coil to another and when computing. According to another variant, all the coils of each order are not identical. In that case, each order can be defined by its first coil and its last coil. The "multiplicity of galvanized coils of metallic strip" as defined above can thus be constituted by all the first coils and last coils of each order. In that case, only combinations of the last coil of a first order and the first coil of a second order are possible and taken into account when evaluating the impact of the transition from one coil to another and when computing.

Comparative simulations have been performed and have shown that the method according to the invention improves the quality of the strip processed during transitions between coils.

The simulations are based on series of uncoated coils scheduled and processed on 3 existing galvanizing lines. The series scheduled according to the prior art (i.e. by attributing an arbitrary penalty or bonus to each kind of transition according to a given product variable) have led to a quality loss which has been measured and quantified. The same series have been rescheduled with the method according to the invention. The results of the computation have been converted into quality loss to make the comparison easier with the quality loss obtained with the scheduling according to the prior art.

Table 1 details the set of parameters selected for each of the 3 galvanizing lines.

Table 2 details the results obtained with both the scheduling according to the prior art ("reference quality loss") and the scheduling according to the invention ("optimized quality loss"). The improvement factor is defined as the ratio between the reference quality loss and the optimized quality loss.

For all 3 galvanizing lines, sequence weighting terms related to the zinc build-up on the roll immersed in the zinc pot and to the scratches on the temper-rolling rolls have been taken into account.

For line 3, the sequence weighting term related to the scratches on the passivation rolls has also been taken into account.

As it is apparent from the results detailed in Table 2, the method of scheduling according to the invention significantly reduces the quality loss.

TABLE 1

| Line section | Sets of parameters | Weighting coefficient dependence - Line 1 | Weighting coefficient dependence - Line 2 | Weighting coefficient dependence - Line 3 |
| --- | --- | --- | --- | --- |
| Annealing | Adjustment of the band temperature and/or speed | Numerical model of annealing furnace | Numerical model of annealing furnace | Numerical model of annealing furnace |
| Wiping | Adjustment of pressure and/or distance | Difference between $1^{st}$ coil CW target and either $2^{nd}$ coil minimum CW tolerance or $2^{nd}$ coil maximum CW tolerance | Difference between $1^{st}$ coil CW target and $2^{nd}$ coil minimum CW tolerance | ratio ((min $2^{nd}$ coil CW tolerance − $1^{st}$ coil CW target)/$2^{nd}$ coil CW target − $1^{st}$ coil CW target)) or ratio (($1^{st}$ coil CW target − max $2^{nd}$ coil CW tolerance)/($2^{nd}$ coil CW target − $1^{st}$ coil CW target)) |
| Temper-rolling | Adjustment of tension and/or rolling force | Line speed and time needed to transition in tension and/or in rolling force | Probability that the coil portion is out of specification | Line speed and time needed to transition in tension and/or in rolling force |
| Leveler | Adjustment of tension | No impact | Probability that the coil portion is out of specification | No impact |
| GA furnace (for GA running mode) | Adjustment of heating power | Ability of the line to detect defect at the exit of the furnace or at the end of the line | N/A | No impact |
| Oiling machine | Adjustment of oil | No impact | Probability of occurrence of the defect | Probability of occurrence of the defect |

CW = coating weight,

N/A = not applicable

TABLE 2

| Example # | Line # | Running mode | Number of coils | Reference quality loss | Optimized quality loss | Improvement factor |
|---|---|---|---|---|---|---|
| 1 | 1 | GI | 27 | 14033 | 844 | 17 |
| 2 | 1 | GI-EXP | 28 | 9112 | 133 | 69 |
| 3 | 1 | GI | 36 | 34575 | 15228 | 2 |
| 4 | 1 | GI | 47 | 47973 | 22618 | 2 |
| 5 | 1 | GI-DP | 51 | 51045 | 156 | 327 |
| 6 | 1 | GI-DP | 86 | 11351 | 4648 | 2 |
| 7 | 1 | GA | 16 | 1584 | 114 | 14 |
| 8 | 1 | GA-DP | 18 | 1427 | 204 | 7 |
| 9 | 2 | GI | 11 | 1254 | 71 | 18 |
| 10 | 2 | GI | 13 | 895 | 149 | 6 |
| 11 | 2 | GU | 20 | 2168 | 1 | 2168 |
| 12 | 2 | GU | 21 | 3701 | 1849 | 2 |
| 13 | 2 | GU | 41 | 3034 | 841 | 4 |
| 14 | 2 | GU | 47 | 2413 | 919 | 3 |
| 15 | 2 | GU | 68 | 436 | 173 | 3 |
| 16 | 3 | GI | 18 | 44280 | 15139 | 3 |
| 17 | 3 | GI | 33 | 3874 | 253 | 15 |
| 18 | 3 | GI-HR | 48 | 24301 | 1671 | 15 |
| 19 | 3 | GI-HR | 57 | 30258 | 1847 | 16 |
| 20 | 3 | GI | 66 | 4914 | 412 | 12 |
| 21 | 3 | GA-HR | 39 | 8018 | 285 | 28 |
| 22 | 3 | GA-HR | 73 | 18223 | 442 | 41 |

GA = galvannealed,
GI = galvanized,
GU = galvalume,
EXP = exposed aspect for Automotive,
DP = Dual-Phase,
HR = hot-rolled

What is claimed is:

1. A method for setting a production schedule of a multiplicity of galvanized coils of metallic strip on a continuous galvanizing line having an annealing furnace, a zinc pot and a wiping machine, the method comprising the steps of:
   collecting a multiplicity of characteristics defining each uncoated coil to be galvanized, a multiplicity of specifications to be reached for each galvanized coil, a multiplicity of process parameters required to reach the specifications of each galvanized coil and a multiplicity of line constraints;
   evaluating, for each possible combination of two uncoated coils, an impact of the transition from the first uncoated coil to the second uncoated coil on a quality of the galvanized coils in relation to at least the following two sets of parameters:
      adjustment of temperature $T_p$ and speed S of the metallic strip in the annealing furnace,
      adjustment of pressure P of a wiping medium and distance D of the wiping machine from the metallic strip at an exit of the zinc pot;
   allocating to each possible combination of uncoated coils a weighting factor dependent on results of the evaluating step and taking into account the line constraints;
   computing the results of the allocating step by calculating, for a number of possible schedules of the multiplicity of uncoated coils, a score dependent on a sum of the weighting factors attributed to the combinations of uncoated coils involved in a given schedule and by selecting the schedule of the possible schedules with the optimal score; and
   galvanizing the uncoated coils of metallic strips on the continuous galvanizing line according to the schedule with the optimal score or according to an adjusted version of the schedule with the optimal score.

2. The method as recited in claim 1 wherein the multiplicity of characteristics defining each uncoated coil includes the thickness, the steel grade, the mechanical properties, the width and the hardness.

3. The method as recited in claim 1 wherein the multiplicity of specifications to be reached for each galvanized coil includes the zinc coating weight, the zinc coating weight tolerance, the occurrence of temper-rolling and the elongation to be reached during temper-rolling.

4. The method as recited in claim 1 wherein the multiplicity of process parameters required to reach the specifications of each galvanized coil includes the target temperature in the annealing furnace, the temperature tolerance in the annealing furnace, the line speed, the line speed tolerance in the annealing furnace, the wiping pressure P, the wiping distance D and the tension and force of the temper-rolling.

5. The method as recited in claim 1 wherein the multiplicity of line constraints includes the maximum capabilities of the line and transitions unauthorized by line operators.

6. The method as recited in claim 1 wherein, during the collecting step, the data are collected either manually or are obtained from an existing database or are computed.

7. The method as recited in claim 1 wherein the collecting step includes a modeling sub-step, at least part of the multiplicity of process parameters being calculated from empirical or physical or statistical laws or equations during the modeling sub-step.

8. The method as recited in claim 1 wherein the impact of the transition from the first uncoated coil to the second uncoated coil on the product quality in relation to one set of parameters is attributed a weighting coefficient.

9. The method as recited in claim 8 wherein, for each possible combination of two uncoated coils, the adjustment of the band temperature and speed in the annealing furnace is attributed the weighting coefficient, the weighting coefficient being dependent on a gap between the temperature tolerances of the two coils or on a gap between the speed tolerances of the two coils.

10. The method as recited in claim 8 wherein the weighting factor allocated to each possible combination of uncoated coils is the sum of the weighting coefficients attributed to the sets of parameters.

11. The method as recited in claim 1 wherein the continuous galvanizing line further includes a temper-rolling and wherein the impact of the transition from the first uncoated coil to the second uncoated coil on the product quality is further evaluated in relation to the adjustment of the tension $T_s$ and force F of the temper rolling.

12. The method as recited in claim 11 wherein, for each possible combination of two uncoated coils, the adjustment of the tension $T_s$ and force F of the temper rolling is attributed a weighting coefficient dependent on the line speed and the time needed to transition from one tension to another and/or from one pression to another.

13. The method as recited in claim 1 wherein the continuous galvanizing line further includes an entry accumulator and wherein the impact of the transition from the first uncoated coil to the second uncoated coil on the product quality is further evaluated in relation to the adjustment of the tension in the entry accumulator or in the annealing furnace.

14. The method as recited in claim 1 wherein the continuous galvanizing line further comprises a tension leveler and wherein the impact of the transition from the first uncoated coil to the second uncoated coil on the product quality is further evaluated in relation to the adjustment of the tension in the tension leveler.

15. The method as recited in claim 1 wherein the continuous galvanizing line further includes a galvannealing furnace and wherein the impact of the transition from the first uncoated coil to the second uncoated coil on the product quality is further evaluated in relation to the adjustment of the heating power in the galvannealing furnace.

16. The method as recited in claim 1 wherein the continuous galvanizing line further includes an oiling machine configured to apply oil on the galvanized coil and wherein the impact of the transition from the first uncoated coil to the second uncoated coil on the product quality is further evaluated in relation to the adjustment of an oil quantity or of an oil nature in the oiling machine.

17. The method as recited in claim 1 wherein the score calculated for a given schedule of the multiplicity of uncoated coils is the sum of the weighting factors attributed to the combinations of uncoated coils composing the schedule.

18. The method as recited in claim 1 wherein the score calculated for a given schedule of the multiplicity of uncoated coils includes sequence weighting terms in addition to the sum of the weighting factors attributed to the combinations of uncoated coils composing the schedule.

19. The method as recited in claim 1 further comprising the steps of:
displaying the schedule with the optimal score and modifying it manually or automatically; and
computing the score of the modified schedule.

20. A computer-readable medium storing computer program including software instructions, the software instructions when executed by a processor implementing the method as recited in claim 1.

21. An electronic scheduling device for setting the production schedule of a multiplicity of galvanized coils of metallic strip on a continuous galvanizing line having an annealing furnace, a zinc pot and a wiping machine, the electronic monitoring device comprising:
an acquisition module configured for collecting a multiplicity of characteristics defining each uncoated coil to be galvanized, a multiplicity of specifications to be reached for each galvanized coil, a multiplicity of process parameters required to reach the specifications of each galvanized coil and a multiplicity of line constraints;
an allocation module configured for evaluating, for each possible combination of two uncoated coils, the impact of the transition from the first uncoated coil to the second uncoated coil on the product quality in relation to at least the following two sets of parameters:
the adjustment of the temperature $T_p$ and speed S of the metallic strip in the annealing furnace,
the adjustment of the pressure P of the wiping medium and distance D of the wiping machine from the metallic strip at the exit of the zinc pot,
and for allocating to each possible combination of uncoated coils a weighting factor dependent on the results of the impact evaluation and which takes into account the line constraints;
a computation module configured for computing the results obtained in the allocation module by calculating, for a number of possible schedules of the multiplicity of uncoated coils, a score dependent on the sum of the weighting factors attributed to the combinations of uncoated coils involved in the given schedule and by selecting the schedule with the optimal score,
the electronic scheduling device being configured controlling the continuous galvanizing line to galvanize the uncoated coils of metallic strips on the continuous galvanizing line according to the schedule with the optimal score or according an adjusted version of the schedule with the optimal score.

22. The electronic scheduling device as recited in claim 21 further comprising a validation module configured for offering a viewing of the schedule selected in the computation module and for allowing a validation or a manual or automatic adjustment of the selected module.

23. An installation for delivering a multiplicity of galvanized coils, the installation comprising:
a continuous galvanizing line for producing the multiplicity of galvanized coils; and
an electronic scheduling device as recited in claim 21 for setting the production schedule of the multiplicity of galvanized coils.

24. A method for producing a galvanized steel product comprising performing the method as recite din claim 1 and connecting the multiplicity of coils according to the selected production schedule.

* * * * *

UNITED STATES PATENT AND TRADEMARK OFFICE
CERTIFICATE OF CORRECTION

| | | |
|---|---|---|
| PATENT NO. | : 12,371,769 B2 | Page 1 of 1 |
| APPLICATION NO. | : 17/776039 | |
| DATED | : July 29, 2025 | |
| INVENTOR(S) | : Diego Diaz Fidalgo et al. | |

It is certified that error appears in the above-identified patent and that said Letters Patent is hereby corrected as shown below:

In the Specification

At Column 3, Line 39, replace "pression" with "pressure"

At Column 9, Line 25, replace "pression" with "pressure"

At Column 9, Line 33, replace "pression" with "pressure"

In the Claims

In Claim 12, Column 20, Line 54, replace "pression" with "pressure"

In Claim 20, Column 21, Line 29, add "a" before "computer program"

ln Claim 24, Column 22, Line 41, replace "recite din" with "recited in"

Signed and Sealed this
Twenty-third Day of December, 2025

John A. Squires
*Director of the United States Patent and Trademark Office*